United States Patent [19]

Nukiyama

[11] Patent Number: 4,658,354

[45] Date of Patent: Apr. 14, 1987

[54] PIPELINE PROCESSING APPARATUS HAVING A TEST FUNCTION

[75] Inventor: Tomoji Nukiyama, Tokyo, Japan

[73] Assignee: NEC Corporation, Japan

[21] Appl. No.: 499,705

[22] Filed: May 31, 1983

[30] Foreign Application Priority Data

May 28, 1982 [JP] Japan .................. 57-90620

[51] Int. Cl.[4] .................. G06F 9/38; G06F 11/00; G06F 13/40
[52] U.S. Cl. ...................................... 364/200; 371/16
[58] Field of Search ... 364/200 MS File, 900 MS File; 371/16; 382/27, 8

[56] References Cited

U.S. PATENT DOCUMENTS

| | | | |
|---|---|---|---|
| 3,980,992 | 9/1976 | Levy et al. | 364/200 |
| 4,149,242 | 4/1979 | Pirz | 364/200 |
| 4,305,124 | 12/1981 | Marro et al. | 364/200 |
| 4,385,363 | 5/1983 | Widergren et al. | 364/725 |
| 4,395,698 | 7/1983 | Sternberg et al. | 382/27 |
| 4,398,176 | 8/1983 | Dargel et al. | 382/27 |
| 4,414,669 | 11/1983 | Heckelman et al. | 371/49 |
| 4,441,207 | 4/1984 | Lougheed et al. | 382/8 |
| 4,443,859 | 4/1984 | Wiggins | 364/725 |
| 4,484,349 | 11/1984 | McCubbrey | 382/49 |

Primary Examiner—Archie E. Williams
Attorney, Agent, or Firm—Sughrue, Mion, Zinn, Macpeak, and Seas

[57] ABSTRACT

A pipeline processing apparatus has a plurality of pipeline stages, each stage including a pipeline latch and a pipeline processing circuit. A pipeline bus serially connects the several pipeline stages such that input data supplied through an input unit can be serially transported through the several pipeline stages and finally to an output unit. To facilitate testing the pipeline processing apparatus and specifically the individual pipeline stages and the data passing through these individual stages independently of the pipeline processing cycle, there is provided a common bus coupled to the input unit, the output unit and selectively to each of the pipeline stages. A designated pipeline stage is selectively coupled to the common bus and to cause test data to be supplied to the designated pipeline stage and subsequently read out from the designated stage.

4 Claims, 7 Drawing Figures

A70, A71, A73, A74 AND A75 = ADDRESS DECODER

PIPELINE PROCESSING APPARATUS HAVING A TEST FUNCTION

BACKGROUND OF THE INVENTION

The present invention relates to a processing apparatus having a pipeline structure, and more particularly to a processing apparatus having the function of effecting a logic test and/or a software test within the apparatus.

A processing apparatus having a pipeline structure is formed by serially coupling a plurality of pipeline stages. Each stage includes a data latch means (hereinafter called pipeline latch) and a processing means. Data to be processed is sequentially shifted via the respective pipeline latches during predetermined pipeline cycles. In a pipeline processing apparatus of a data flow execution model, data, input through terminals are accompanied by a processing command which is read out of an internal memory, and transferred through the pipeline latches. After the data are processed in each pipeline stage, the result is taken out of output terminals. The detailed structure of this model is described in U.S. patent application Ser. No. 436,130, filed on Oct. 22, 1982 and entitled "Data Processing Machine Suitable For High Speed Processing". This apparatus has many advantages. First of all, high speed processing can be expected because the respective pipeline stages can operate in parallel. Secondly, a multiprocessor system can be easily constructed by coupling the input terminals of one apparatus to the output terminals of another apparatus. Further, many kinds of programs can be processed by means of the same hardware architecture. Moreover, since the large-scale integrated circuit technique can be employed, at least one pipeline processing apparatus can be integrated on a single semiconductor chip.

However, only the processing result appears at the output terminals, and none of the intermediate data of the processing appear at the output terminals. More particularly, the input data set is processed by sequential circuits and/or combinational circuits in the pipeline stages and is set in an output latch as the final result. The output terminals are only coupled to this output latch. Therefore, it is very difficult to know the processing state within the pipeline latches or the logic operations in the respective pipeline stages from the output result. This means that the pipeline processing apparatus of the prior art cannot be easily monitored or tested. That is, in the prior art, when the expected output data is not obtained it cannot be determined whether the cause of the failure exists in the software or in the hardware. If a bug is present in the software, a long period of time is required for discovering the bug because it is difficult to trace the program and because it is difficult to maintain intermediate data for future analysis when a defect exists in the hardware, it takes a long period of time for analyzing which circuit is faulty. Therefore, there is a delay before the design can be changed to eliminate the problems encountered.

In a pipeline processing apparatus, there are many data sets whose contents are sequentially varied in the respective pipeline stages. In addition, loop processing is executed only within the apparatus, and intermediate data does not appear at the output terminals. Furthermore, data which is generated midway in the processing and subsequently disappears in the pipeline stages is not derived from the output terminals. Accordingly, so long as the states of the pipeline stages cannot be directly observed externally, it is difficult to improve the testability of the pipe line apparatus.

Moreover, in a conventional pipeline processing apparatus, processing is advanced at a pipeline cycle rate that is fixed by the hardware architecture, and a test is also executed at the pipeline cycle rate. Therefore, a more complex test requiring a long pipeline cycle is impossible. For example, an input of a long test pattern is not acceptable, because a long period of time is required to apply the test pattern to the pipeline stages. That is, the prior art pipeline processor has a shortcoming in that the pipeline cycle can not be controlled by an external control signal. Testing may be effected by connecting externally extending signal lines to each of the pipeline stages. However, in the case where the processing apparatus is formed on an LSI chip, the number of external terminals is limited by the chip size. Further, the package is enlarged in size by the increase of test terminals for the respective stages. In addition, the number of bits output data bits is reduced, and hence the effectiveness of the pipeline processing apparatus which has the advantage of high speed processing, would be lost.

As described above, although the prior art pipeline processing apparatus is favorable for high speed-processing and multi-processing, it was not easily tested for hardware failure; nor can the internal state or the intermediate processing data be readily observed.

SUMMARY OF THE INVENTION

It is therefore one object of the present invention to provide a pipeline processing apparatus which can be more easily tested.

Another object of the present invention is to provide a data flow control type processing apparatus having a pipeline structure, including a circuit which can designate any arbitrary pipeline stage so as to directly output the contents of the pipeline latch in that pipeline stage.

Still another object of the present invention is to provide a pipeline processing apparatus including a circuit which can directly set data in any arbitrary pipeline latch.

Yet another object of the present invention is to provide a pipeline processor having means for externally controlling a pipeline cycle to permit input of long data or to enable ouptut of the contents of the pipeline latch at any arbitrary timing.

A still further object of the present invention is to provide a pipeline processor which can simply test the data passing through the pipeline latches.

Another object of the present invention is to provide a pipeline processing apparatus in which a circuit for testing the respective pipeline stages is formed on an LSI chip without increasing the number of input and output terminals.

Still another object of the present invention is to provide a pipeline processing apparatus having a circuit for setting test data to be required in a designated pipeline latch without inputting test data.

Yet another object of the present invention is to provide a pipeline processing machine having functions to temporarily stack at least one intermediate processing data and to observe the stacked data at desired timing.

A pipeline processing apparatus of the present invention comprises a plurality of pipeline stages, a pipeline bus for serially coupling the pipeline stages, an input portion for applying data to be processed to a first pipeline stage, an output portion for taking out data which has been processed in the pipeline stages, a common bus coupled to the input portion and the output portion and having a plurality of coupling portions to which the pipeline stages are coupled, a first circuitry for designating at least one pipeline stage, a second circuitry for coupling the designated pipeline stage to the associated coupling portion of the common bus, and a third circuitry for setting data on the common bus in the designated pipeline stage and/or for reading out data of the designated pipeline stage to the common bus.

According to the present invention, since the common bus used as an input and/or an output of the test data is provided in the pipeline apparatus, any arbitrary pipeline stage can be tested without using the pipeline bus. Particularly, the test data is directly set in a selected pipeline stage through the common bus, and/or the data in the selected pipeline stage is directly read out. Accordingly, observation of the states of the pipeline stages has become possible, and hence the testability of the pipeline processing apparatus can be greatly improved. Furthermore intermediate data can be selectively checked, and thereby a partial test can be executed. This is very effective not only for makers but also for users. Furthermore, since the coupling between the pipeline stages and the common bus can be externally controlled by making use of the first circuitry (the designation circuit) for pipeline stages, data can be transferred to a desired pipeline stage while by-passing unnecessary pipeline stages, and thereby high speed testing of only a selected stage can be achieved.

Furthermore, the selected pipeline stages are coupled to the common bus and the remaining pipeline stages are decoupled from the common bus, and therefore, a pipeline cycle can be freely controlled externally. It is also easy to stop the operation of the pipeline stages discoupled from the common bus. This is an advantage for a pipeline processing apparatus which is designed so as to operate at a fixed speed according to a basic clock. The respective pipeline stages can operate temporarily as latch circuitry by stopping their operation. In this operation, the basic clock may be masked so that is not applied to the pipeline stages. Under such condition, the data setting and/or the data reading-out is carried out at a desired timing. Accordingly, the input/output of test data can be executed independently of the basic clock. This is especially effective in a data flow control system. In a data flow control system, various commands and new data are generated in each pipeline stage, and these generated commands and new data are transferred through a pipeline bus to the pipeline latch of the next pipeline stage with data to be processed. Accordingly, the number of pipeline latches of the pipeline stages are normally larger than the number of the input terminals of the processing apparatus. Consequently, the test data transferred via the common bus from the input terminals to the long pipeline latch must be transmitted on a time-division basis. However, in the case where a pipeline stage includes a sequential circuit or the like, the state of the pipeline stage may change during the time-division data transfer. On the other hand, the present invention can stop the internal basic clock and can control the operation timing externally. Therefore, test data that is longer than the number of input terminals can be directly set in the pipeline latch without changing of the state in the pipeline stage.

Furthermore, to control the pipeline cycle externally as described above is very effective not only to input data into the pipeline latch but also for extracting data in the pipeline latch through the common bus. For instance, a taking-out of data, which are longer than number of the output terminals from the pipeline latch, must be derived on a time-division basis. In such a case, the taking-out can be done while stopping the operation of the other stages, and can be done without destroying the pipeline processing flow.

Furthermore, the respective pipeline latches may be formed in a two-stage latch construction, in which the first pipeline latch in the two-stage latch structure is coupled to the pipeline bus and the common bus and the second pipeline latch is coupled to the first pipeline latch and the common bus. In this construction, by designating a pipeline stage, the contents in the first latch of the designated pipeline stage are stacked in the second latch. That is, the second latch is used as a stack register. As a result, the state of the stage under any arbitrary timing can be preserved without interrupting a processing flow in the respective pipeline stages. And by taking out the contents in the second latch through the common bus, the state of the stage can be observed at any desired time point. Furthermore, the contents can be transmitted to another pipeline stage at any arbitrary timing. In this way, since data can be dumped within the latch, a virtual pipeline cycle can be made variable without disturbing processing flow of the pipeline data. Consequently, in parallel to test processing, the contents in the respective latches can be checked independently of each other. Moreover, this function is effective not only for testing but also for dump processing upon normal pipeline processing.

Furthermore, the conventional address decode system can be employed as the pipeline stage designating circuit. An address decoder is provided in each pipeline stage and designating addresses of pipeline stages are fed through the common bus. As a result, only the desired pipeline stages are selected, and the other pipeline stages are electrically disconnected from the common bus. Under this condition, selective testing between the desired pipeline stages becomes possible. Among the data flowing through the pipeline bus, there are such data that are not subjected to processing in a certain stage but in themselves passed therethrough to the next stage. A pipeline processing apparatus is however, characterized in that the respective pipeline stage necessarily have pipeline latches so that the processings of the respective pipeline stages may be synchronized. In other words, the number of pipeline latches are the same as the number of pipeline cycles, and all data may be shifted through all the provided pipeline latches. Accordingly, among the data to be processed, there is the data which is merely passed through without being subjected to processing. With respect to such data, it is more desirable that a transfer check can be done only between the latches before and behind the pipeline stage through which the data are passed. The present invention is favorable for a test between one latch and the subsequent latch. These latches are addressed via the common bus and are coupled to the common bus. In this way, the preceding latch is set in its writing condition, while the succeeding latch is set in its reading condition. The test data is set into the preceding latch through the common bus. The set data are transferred to the latch in the succeeding stage via the pipeline bus. The transferred data are read out from the latch in the succeeding stage to the common bus and are in themselves taken out externally. Accordingly, when the taken out data are checked, if they are identical to the input data, then the passing through between the respective latches is good, whereas if the respective data are different, it can be easily found within a short period of time that there exists a fault in the passing through between these latches. On the other hand, in some cases there are not provided a sufficient number of input terminals enabling the transfer of check data jointly with an address for designating a pipeline stage through which data are passed, and in other cases, a check data set is so long that it cannot be set in a latch in one operation. In these cases, a memory or a PLA (programmable logic array), in which a data set for checking is stored, may be employed, and in response to an address designating a pipeline stage through which data are passed, or in response to a pseudo-address formed by subjecting the aforementioned address to control or modification, the employed memory or PLA is accessed and check data is read therefrom and is set in the designated pipeline latch. By making such provision, data through check can be done at a high speed.

As described above, according to the present invention, test processing which was impossible in the pipeline processing apparatus in the prior art, can be achieved easily by making use of a common bus without disturbing flow of pipeline processing. Especially, either a test conducted through all the pipeline stages or a test conducted through only a desired stage or stages can be executed by switching selectively. In addition, dump processing in which contents in a desired pipeline latch are stacked is also possible, and this is available not only for test processing but also for normal pipeline processing.

The above-mentioned and other objects, features and advantages of the present invention will become more apparent by reference to the following description of preferred embodiments of the invention taken in conjunction with the accompanying drawings.

DESCRIPTION OF THE PRIOR ART

Figure 1:
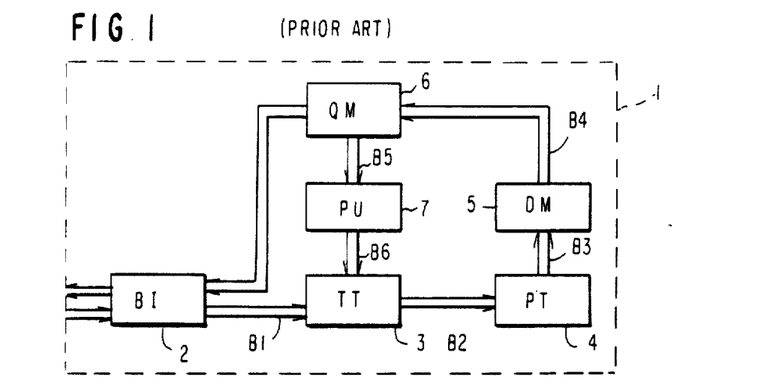
FIG. 1 is a block diagram of a data flow type pipeline processing apparatus in the prior art.

Referring now to FIG. 1, there is shown a system block diagram of a heretofore proposed pipeline processing apparatus relying upon data flow control. The construction and operation of this processing apparatus are described in detail in the above-referred to U.S. patent application Ser. No. 436,130, and so, only the outline of the construction and operation of the processing apparatus will be described here. The processing apparatus includes 6 pipeline stages which are all integrated on an LSI semiconductor chip represented by a dotted-line frame 1. The pipeline stages shown in this figure are 6 stages consisting of a bus interface unit (BI) 2, a transfer table memory (TT) 3, a parameter table memory (PT) 4, a data memory (DM) 5, a queue memory (QM) 6 and a processor unit (PU) 7. As a matter of course, in another pipeline processing apparatus, any arbitrary one or ones of these stages could be omitted, or another stage could be added further. The illustrated respective stages are coupled in a ring form in the sequence of BI-TT-PT-DM-QM-PU by means of buses $B_1$ to $B_6$ according to the pipeline system (hereinafter called pipeline buses), and the circuit is closed on an LSI chip. In the queue memory (QM) 6, processing is not effected; but this stage is used as a cushion for a pipeline. An output is transferred from the queue memory (QM) 6 through the bus $B_7$ to the bus interface unit (BI) 2. The bus interface unit (BI) 2 is coupled to input terminals and output terminals of the processing unit so that data transfer can be achieved with the external apparatus. It is to be noted that the bus interface unit (BI) 2 could be coupled to terminals which are common to both input and output line. Data input via the bus interface unit (BI) 2 are transmitted to the transfer table memory (TT) 3 and the pattern table memory (PT) 4. In the TT 3 and PT 4 are stored ID codes indicating destinations of data and OP codes indicating instructions, and they are accessed as addressed by a partial bit or bits of the input data. These ID code and OP code are joined in one set and called "template", and an assembly of templates forms a program. By the data read from the PT 4, generation of an address of the data memory (DM) 5 and read-write control thereof are effected, and also an instruction for the processor unit (PD) 7 is produced. The data memory (DM) 5 stores constants to be used for constant calculation and a table for table look-up processing. In addition, this memory is used as a queue for dual data operation or as a buffer for input-/output data. The queue memory (QM) 6 is used for queuing of data to be transmitted to the PU 7 or the BI 2. The processor unit (PU) 7 carries out logic operation, arithmetic operation, and control of data accompanying with modification of an ID code. The pipeline processing apparatus in FIG. 1 consists of 6 units (BI, TT, PT, DM, QM and PU) having the above-described functions, and between one unit and an adjacent unit is provided a latch (hereinafter called "pipeline latch"). As a result, input, output and processing of data can be achieved in parallel within the respective stages, and hence a high performance can be obtained. It is to be noted that in each block if it is necessary depending upon processing time and processing contents, the block could be divided into a plurality of blocks.

Figure 2:
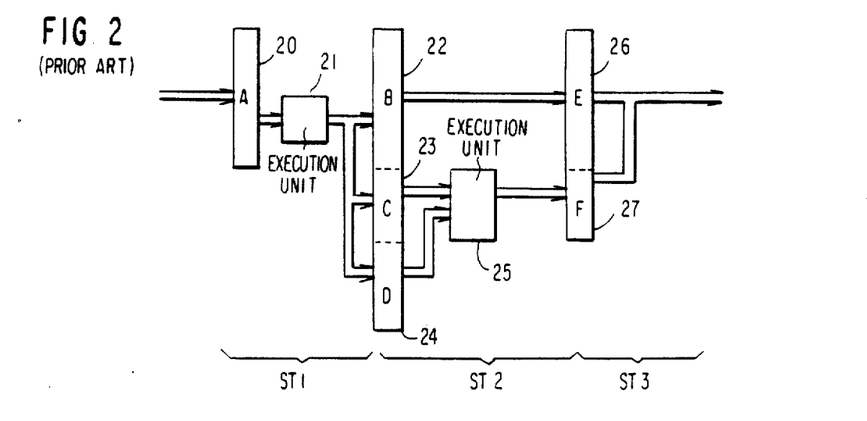
FIG. 2 is an enlarged block diagram of a part of the circuit shown in FIG. 1, three stages of pipeline latches being included in this figure.

In such a processing unit, data are passed through the respective data buses and processed in the respective stages. They are transferred sequentially through the ring as new data and instruction commands are produced. The final result is output from the QM 6 to the bus $B_7$ and the result appears at external output terminals via the BI 2. Accordingly, the lengths of the pipeline latches associated with the respective units are different, and especially it is a common practice for the latches of the units other than the latch in the BI 2, which is coupled to the external terminals, are longer than the latch in the BI 2. This state is shown in FIG. 2. FIG. 2 is a circuit block diagram prepared by picking up a part of FIG. 1 and enlarging that part. This diagram includes three pipeline latches and two units between these latches. A first pipeline stage $ST_1$ includes one pipeline latch portion (A) 20 and an execution unit 21. A second pipeline stage $ST_2$ includes three pipeline latch portions (B) 22, (C) 23 and (D) 24 and an execution unit 25. Pipeline latch portions (E) 26 and (F) 27 located in the subsequent stage are the pipeline latch included in the third pipeline stage $ST_3$. More particularly, the data output from the pipeline latch portion (A) 20 in the first stage $ST_1$ to the pipeline bus have the number of data increased by being processed in the execution unit 22. The characteristic feature of a data flow control system is that control is effected in such manner that data may flow to the next pipeline stage accompanied by data newly produced by processing. Accordingly, in the second pipeline stage $ST_2$ are provided three latch portions (B) 22, (C) 23 and (D) 24 which can hold three kinds of data. Among these data, the data in the latch portions (C) 23 and (D) 24 are processed by the execution unit 25 and the result is transmitted to the latch portion (F) 27 in the third pipeline stage $ST_3$. On the other hand, the data in the latch portion (B) 22 is passed through the pipeline bus without being processed and transmitted to the latch portion (E) 26 in the next pipeline stage $ST_3$.

As is apparent from FIG. 1, in the prior art, pipeline processing apparatus having the above-mentioned circuit construction, data fed externally are allowed to be input only through the external input terminals coupled to the bus interface unit (BI) 2. Moreover, the input data are allowed to be transferred only through the pipeline buses. In addition, the sequence of transfer is also fixed, and basically the transfer path cannot be modified to a sequence other than the sequence BI-TT-PT-DM-QM-PU-TT-PT-DM-QM-BI. In other words, data cannot be transferred to the next stage unless they pass through a pipeline stage coupled immediately therebehind. However, when data is moved through a pipeline stage, the data is processed in that stage, in some case the contents of the data would be varied. Accordingly, for testing such a processing apparatus in the prior art, there was no way except for the method of checking the final result (the output data appearing at the output terminals) after the input test data had been processed. In other words, a test of whether the hardware or software of the processing apparatus is good or bad only, could be done. However, under such situation, it is very difficult to detect what portion is faulty. Especially in the design of hardwares and in the development of softwares, analysis of the cause of faults is most important.

What is considered to be a cause of faults in a processing unit is that the individual logic elements are not achieving proper operation, a programmed instruction is not correctly executed, or the program itself includes errors. However, it was difficult in the pipeline processing apparatus of the prior art to make analysis within a short period of time on what logic element is abnormal, in which pipeline stage is an instruction not correctly executed, and what instruction in the program is faulty. For instance, even if a fault exists in the execution unit 21 of FIG. 2, since the contents of the latch portions (B) 22, (C) 23 and (D) 24 cannot be checked directly, the analysis of the faulty location (unit 21) is difficult. Furthermore, since an independent test for each stage unit cannot be effected, even if it is assumed that a fault exists only in the second pipeline stage $ST_2$, the location of the fault in the pipeline stage $ST_2$ cannot be searched. Since the pipeline latch portions (B), (C) and (D) in the second stage are longer than the pipeline latch portion (A) in the preceding stage, test data cannot be set in the pipeline latch portsions (B), (C) and (D) before being processed in the execution unit 21. Furthermore, it is impossible to pick out and check date in a portion through which data are passed without being processed, such as from the pipeline bus between the latch portion (B) 22 and the latch portion (E) 26. That is, checking of a pipeline bus is also impossible. In addition, in each pipeline stage since processing is effected on the basis of a predetermined pipeline cycle, it is further impossible to preserve the contents of the latch at any arbitrary timing.

DESCRIPTION OF THE PREFERRED EMBODIMENT

Figure 3:
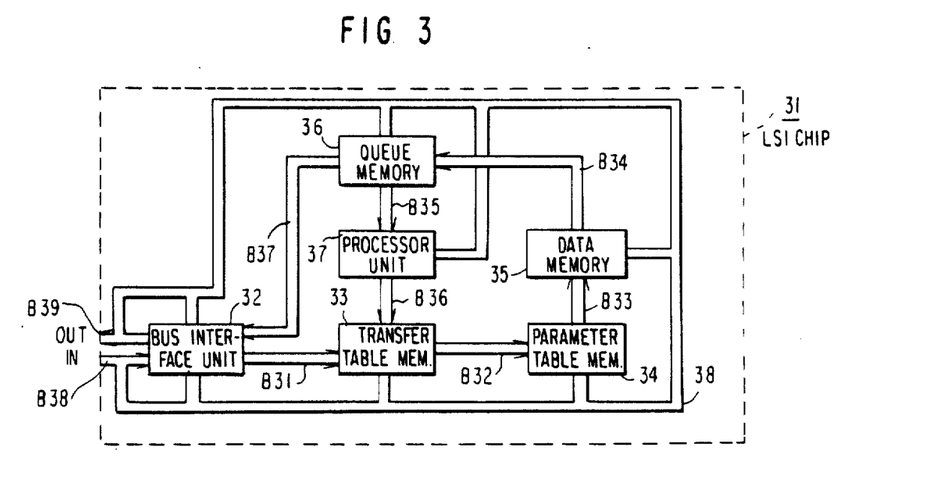
FIG. 3 is a block diagram of a data flow type pipeline processing apparatus according to one preferred embodiment of the present invention.

FIG. 3 is a block diagram of one preferred embodiment of the present invention as applied to a pipeline processing apparatus of the data flow control type. Six units (BT 32, TT 33, PT 34, DM 35, QM 36 and PU 37) integrated on a LSI chip 31 have the same functions as those of the corresponding units shown in FIG. 1. As in FIG. 1, the respective units are serially connected through pipeline buses $B_{31}$ through $B_{37}$. In normal pipeline processing, data input through input terminals IN are processed through the path of BI-TT-PT-DM-QM-PU-TT-PT-DM-QM-BI, and the result is taken out through output terminals OUT. In addition, if required, loop processing is effected within the ring consisting of TT-PT-DM-QM-PU-TT. What is different from the circuit shown in FIG. 1 is that a common bus 38 is formed on the LSI chip 31. The opposite ends of the common bus 38 are coupled to a bus $B_{38}$ which is coupled to the input terminals IN and to a bus $B_{39}$ which is coupled to the output terminals OUT. Furthermore, the common bus 38 has contact portions in contact with the respective units so that it may be individually coupled to these units. This common bus 38 is very effectively used upon testing. The respective units are provided with pipeline latches as in the apparatus of FIG. 1. Moreover, though the length of the pipeline latches are respectively different depending upon the processing carried out in the respective units, all the pipeline latches could have the same length. Furthermore, the input terminals IN and the output terminals OUT could be provided as common terminals.

Figure 4:
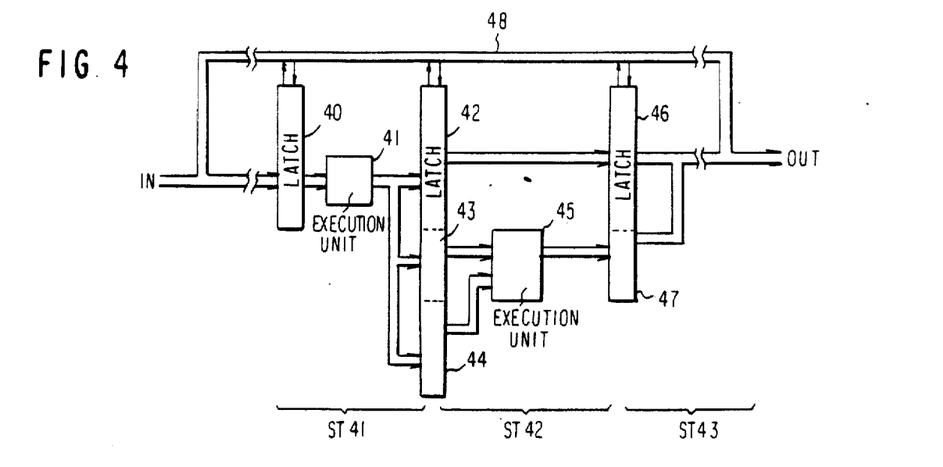
FIG. 4 is a circuit block diagram showing a part of the pipeline processing apparatus shown in FIG. 3, three stages of pipeline latches being included in this figure.

FIG. 4 is a circuit block diagram showing a part of the circuit in FIG. 3 in an enlarged scale. In this figure are included a first pipeline stage $ST_{41}$ having an execution unit 41, a second pipeline stage $ST_{42}$ having an execution unit 45, and pipeline latches 46 and 47 of a third pipeline stage $ST_{43}$ which is located in the subsequent stage. The first pipeline stage $ST_{41}$ has a short pipeline latch 40, while the second pipeline stage $ST_{42}$ has a long pipeline latch (42, 43 and 44). The respective stages process the data input through the input terminals IN, transfer the processed data to the subsequent stages through a pipeline bus, and the final result of processing is taken out from the output terminals OUT. In addition, a common bus 48 is formed separately from the pipeline bus. This common bus 48 is capable of being coupled to the respective pipeline stages. In FIG. 4, the common bus 48 is designed to be capable of being coupled to the respective pipeline latch portions 40, 42, 43, 44, 46 and 47. Furthermore, though it is not shown in FIG. 4, each stage has a circuit responsive to an address fed from the input terminal IN through the common bus 48 for selecting a designated pipeline latch portion or portions and coupling them to the common bus.

According to the above-described embodiment of the pipeline processing apparatus, there is provided a common bus 48 independently of the pipeline bus, and provision is made such that by feeding an address through this common bus 48, any arbitrary pipeline stage can be selected to couple the data input and data output of that pipeline stage to the common bus 49. In other words, the processing unit is constructed in such a manner that only a desired pipeline stage can be coupled to the common bus 48 and thereby data can be directly set in the designated stage or data can be directly read out therefrom through the common bus 48. Consequently, only a desired pipeline stage can be selectively tested, and hence an effective test as will be described later can be achieved. In addition, since the operating time of a pipeline stage can be independently and externally controlled during a cycle separate from the predetermined pipeline cycle, it is possible to set data at a desired stage on a time-division basis, to derive data from the stage on a time-division basis, or to take out data in an arbitrary timing at a desired time. These effective advantages obtained according to the present invention will be explained in the following with reference to FIGS. 5 to 7.

Figure 5:
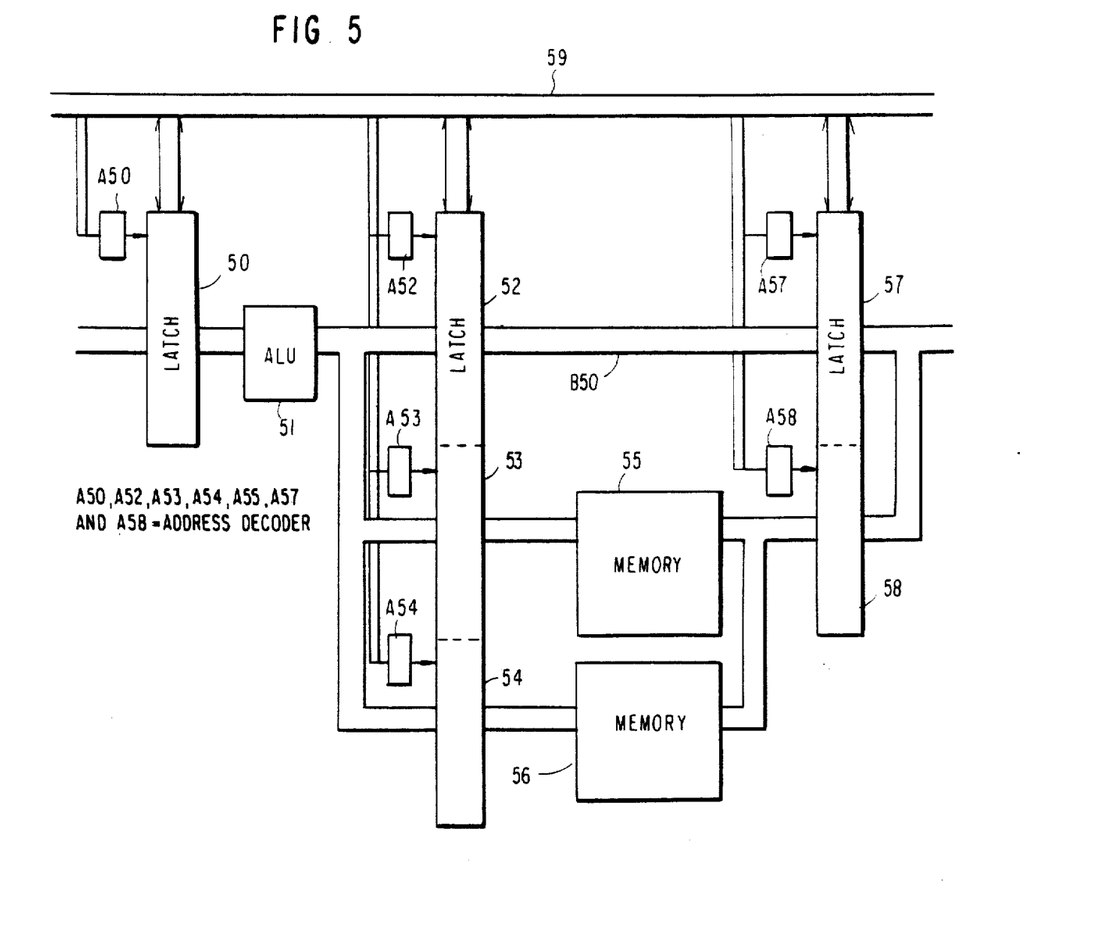
FIG. 5 is an enlarged circuit block diagram of an essential part of the pipeline processing apparatus in FIG. 3.

FIG. 5 is a circuit block diagram which picks up and illustrates in detail a pipeline stage including an execution unit having an ALU 51 and another pipeline stage including an execution unit having memories 55 and 56. In the stage having the ALU 51 is provided a pipeline latch portion 50 having a 16-bit length. On the other hand, in the stage having the memories 55 and 56 are provided pipeline latch portions 52, 53 and 54 having a 16-bit length, a 14-bit length and a 14-bit length, respectively. The pipeline latch portion 52 having a 16-bit length is coupled to an input of a pipeline latch portion 57 (having a 16-bit length) in the subsequent stage through a pipeline bus B50. On the other hand, the output data from the memories 55 and 56 are alternately switched by a multiplexer (not shown) and are input to a pipeline latch portion 58 (having a 16-bit length) in the subsequent stage. The data processed by the ALU 51 are expanded with newly generated data and/or instruction commands, and are input to the corresponding pipeline latch portions 52, 53 and 54. This is a big characteristic feature of the data flow control. In the illustrated example, a common bus 59 is wired so as to be capable of being coupled to the respective pipeline latch portions 50, 52, 53, 54, 57 and 58. Furthermore, the respective latches have addressed for read and addresses for write, and a read mode and a write mode of the respective latches are controlled by address decoders A50, A52, A53, A54, A57 and A58 associated with the respective latch portions. More particularly, for instance, if an address for reading the data in the latch portion 50 is transferred through the common bus 59, the address decoder A50 would decode this address and would couple the output buffer of the latch portion 50 to the common bus 59. Or else, an address for writing data in the latch portion 52 is transferred through the common bus 59, then the address decoder A52 would decode this address and would couple the input buffer of the latch portion 52 to the common bus 59, so that data on the common bus can be directly set in the latch portion 52. Here it is to be noted that although the common bus 59 is provided with an address bus and a data bus separately, provision could be made such that an address bus and a data bus are provided in common on a time-division basis by making use of a bus-separator system or a multiplexer system.

By constructing a pipeline processing apparatus in the above-described manner, it is possible for a desired pipeline latch to be selected by feeding an address from the input terminals IN to the common bus 59, to directly set data in the selected latch or to directly read out data from the selected latch. Accordingly, for instance, if the latch portion 50 is designated to be in a write mode while the latch portions 52, 53 and 54 are designated to be in a read mode, then only the ALU51 can be selectively checked. If the latch portion 58 is additionally designated, then it is possible to test the memory 55. This is because owing to the provision of the common bus 59 it has become possible to directly set data at a desired latch and to directly take out data from a desired latch by making use of the common bus 59. On the other hand, since the undesignated latches are decoupled from the common bus 59, they are not adversely effected. The clock signal to be applied to pipeline stages which are not designated is masked in response to the address. When a test is conducted between the latch portions 52, 53 and 54 and the latch portions 57 and 58, it is required to directly set test data in all the latch portions 52, 53 and 54. However, since the data to be set in these latch portions 52, 53 and 54 are the data obtained after processing by the ALU 51 in the preceding stage, if an anomaly exists in the ALU 51, this test cannot be achieved. Even if an anomaly does not exist in the ALU 51, in the case where the ALU includes a sequential circuit, the data would be changed. Furthermore, even if the processing in the ALU 51 is stopped, since the latch consisting of latch portions 52, 53 and 54 are longer than the latch 50, test data cannot be set in one operation. However, by providing the common bus 59 according to this preferred embodiment, data can be set in the latch portions 52, 53 and 54 on a time-division basis while the operation of the latch 50 is stopped by masking the clock signal, and hence the test between the latches becomes possible. In other words, there is an advantage that a test cycle can be easily controlled externally.

Figure 6:
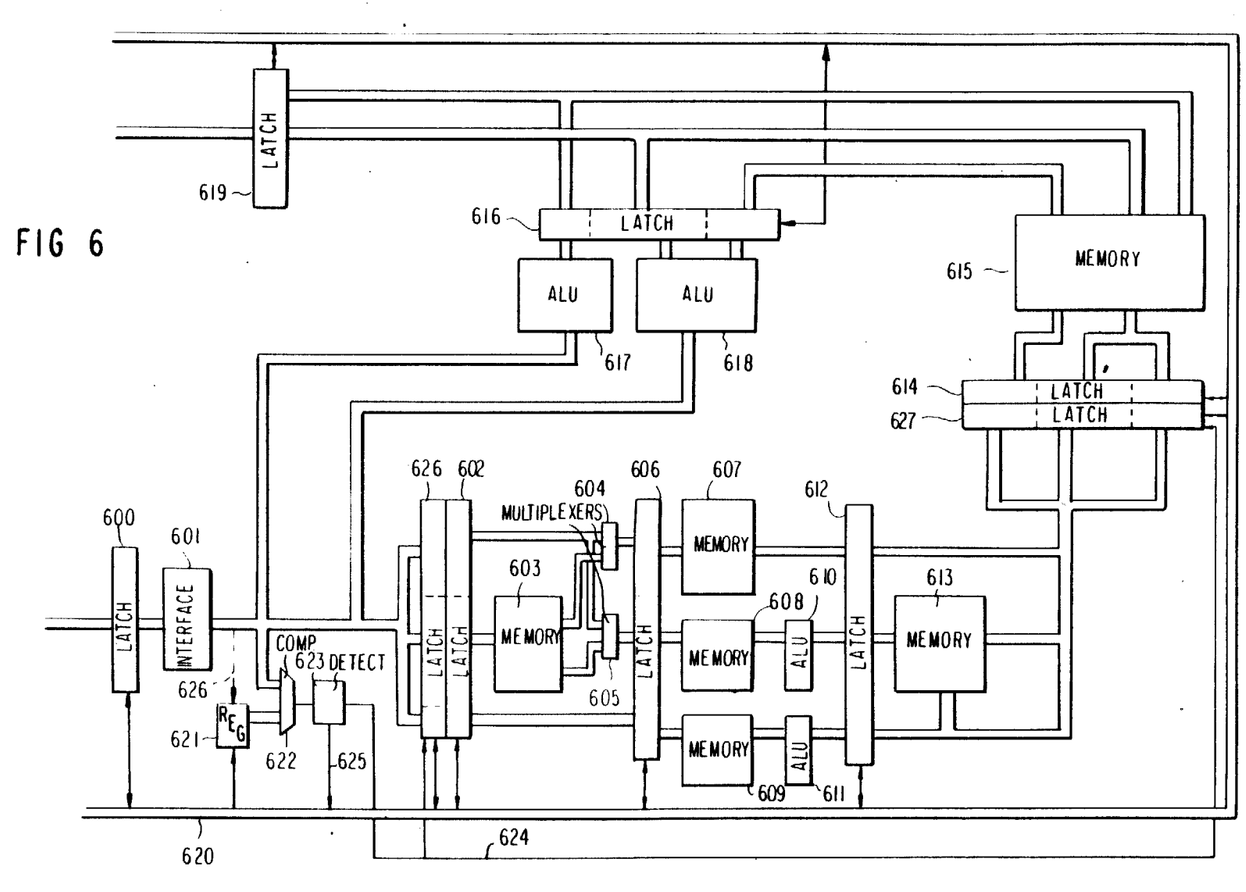
FIG. 6 is a circuit block diagram showing another preferred embodiment of the pipeline processing apparatus according to the present invention.

FIG. 6 is a circuit block diagram of another preferred embodiment of the present invention, in which data in a desired pipeline latch are stacked at an arbitrary timing by making use of the common bus. The stacked data can be taken out externally at a desired time. In this figure the apparatus includes six pipeline stages. The first stage includes a latch 600 and an input data interface unit 601. The next stage includes a latch 602, a memory 603 and multiplexers 604 and 605. The third stage includes a latch 606, memories 607, 608 and 609 and ALU's 610 and 611, and the fourth stage includes a latch 612 and a data memory 613. The fifth stage includes a latch 614 and a queue memory 615, and the output of the queue memory 615 is transferred to a latch 619 of an output stage and a latch 616 of a processor unit. The processor unit includes the latch 616 and ALU's 617 and 618 and is coupled to the latch 602 in the second stage, and thus pipeline buses are wired in a ring form. In addition, there is provided a common bus 620 which is coupled in common to the latches in the respective stages. The latch 602 in the second stage and the latch 614 in the fifth stage are respectively formed as a two-stage latch, and they are respectively associated with auxiliary latches 626 and 627 having the same length. These auxiliary latches 626 and 627 are both capable of being coupled to the common bus 620, and they serve the function of a stack register. A stack operation is executed in the following manner. Data indicating commencement of stack are set from the common bus 620 in a register 621. This data are compared in a comparator 622 with data transferred from the unit 601 or the ALU's 617 and 618, and when both data coincide with each other, the coincidence is detected by a detector 623. Then the detector 623 issues a coincidence signal 624, and in response to this coincidence signal, the auxiliary latches 626 and 627 functioning as registers stack the data then latched in the latches 602 and 614. The stacked data are read out through the common bus 620 when the address designating the respective latches 626 and 627 have been transferred to these latches through the common bus 620.

As a result, the contents of the latch at any arbitrary timing have been stacked in the corresponding auxiliary latch without stopping the pipeline processing, and the stacked data can be taken out at a desired time. Accordingly, not only test processing, but also a dump operation during normal pipeline processing becomes possible. Hence this arrangement is very effective. It is to be noted that modification could be made such that the state of the detector 623 is read out through the common bus 620 so that it can be observed externally. Alternatively, the data indicating a stack operation could be set in the register 621 from the pipeline bus through an additional bus 626 represented by a dotted line.

Figure 7:
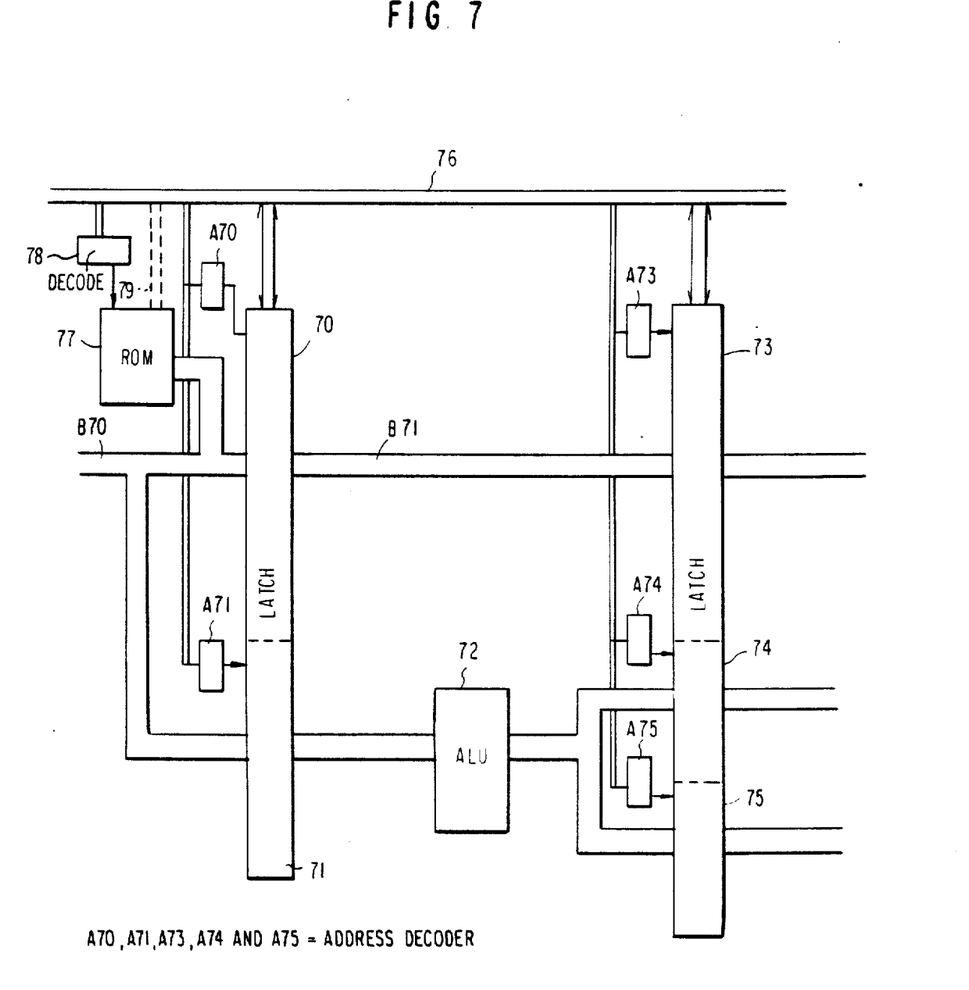
FIG. 7 is a partial enlarged circuit block diagram of a pipeline stage used in one part of a pipeline processing apparatus according to still another preferred embodiment of the present invention.

FIG. 7 is a block diagram showing a circuit which is effective for checking data that pass between latches. In this figure, a first pipeline latch includes two latch portions 70 and 71, and a second pipeline latch includes three latch portions 73, 74 and 75. The respective latches are associated with address decoders A70, A71, A73, A74 and A75. Data set in the latch portion 71 are processed by an ALU 72 and transferred to the latch portions 74 and 75 in the next stage. A common bus 76 is coupled to the respective latches and the address decoders.

Unless the common bus 76 is provided, checking of the data passing between the latch 70 and the latch 73 is impossible. This is because the data incoming through the pipeline bus $B_{70}$ have their contents modified by the processing in the preceding stage and so it cannot be checked what data have been set in the latch 70. However, by providing the common bus 76 as shown in FIG. 7, a particular latch can be designated and data can be directly set in the designated latch, so that the aforementioned shortcoming can be overcome. But, in the case of feeding the data to be set in the latch 70 from the common bus 76, a test period will be prolonged by a corresponding amount. Accordingly, as shown in FIG. 7, a modification can be made such that by providing a ROM or PLA 77 in which a fixed code is stored in the preceding stage of the latch 70, the data designating a read mode of the latch 70 are decoded by a decoder 78 and thereby the TOM or PLA 77 may be accessed. As a result, a predetermined code is set in the latch 70 and this code can be transferred to the latch 73 via the pipeline bus $B_{71}$. Thereafter, by taking out the data in the latch 73 through the common bus 76, a transfer test between these latches can be achieved at high speed.

As described above, according to the present invention, a test can be achieved without disturbing a pipeline, and the aforementioned various advantages can be obtained.

What is claimed is:

1. A pipeline processing apparatus having a test function comprising:

a first latch circuit;

a first unit having at least one memory and/or at least one processor;

a first address decoder coupled to said first latch circuit;

a first pipeline bus coupled between said first latch circuit and said first unit;

a second latch circuit;

a second pipeline bus coupled between said first unit and said second latch circuit;

a second unit having at least one memory and/or at least one processor;

a second address decoder coupled to said second latch circuit;

a third pipeline bus coupled between said second latch circuit and said second unit;

a third latch circuit;

a fourth pipeline bus coupled between said second unit and said third latch circuit;

a third address decoder coupled to said third latch circuit;

fifth and sixth pipeline buses coupled to said first and third latch circuits, respectively;

an input means coupled to said fifth pipeline bus for applying a data to be processed in said first and second units;

an output means coupled to said sixth pipeline bus for outputting a data;

an address bus for transferring an address designating one of the latch circuits and provided separately from said pipeline buses, said first, second and third address decoders being coupled in parallel to said address bus;

a test bus provided separately from said pipeline buses and operatively coupled to said first, second and third latch circuits in parallel;

means for transferring a first address for a write operation, via said address bus, to said first address decoder which generates a write control signal upon receipt of said first address and applies the write control signal to said first latch circuit;

means for transferring a test data to said first latch circuit via said test bus, said first latch circuit transferring, upon receipt of said write control signal and said test data, said test data to said first unit via said first pipeline unit to allow said first unit to execute an operation according to the test data and to send a result of the operation to said second latch circuit via said second pipeline bus;

means for applying a second address for a read operation to said second address decoder which generates a read control signal upon receipt of said second address and applies said read control signal to said second latch circuit; and means for transferring said result of the operation set in said second latch circuit, upon receipt of said read control signal, to said test bus without being transferred to said third, fourth and sixth pipeline buses.

2. A pipeline processor as claimed in claim 1, wherein at least one of said first to third latch circuits includes a fourth latch circuit and directly transfers a data set therein to said fourth latch circuit in response to a control signal designating a stack operation.

3. A pipeline processing apparatus as claimed in claim 2, further comprising means for transferring the data set in said fourth latch circuit to said test bus.

4. A pipeline processor apparatus as claimed in claim 1, further comprising means for preliminarily storing a test data, and means for transferring said test data from said storing means to said test bus in response to said write control signal generated by said first address decoder.

* * * * *

UNITED STATES PATENT AND TRADEMARK OFFICE
CERTIFICATE OF CORRECTION

PATENT NO. : 4,658,354
DATED : April 14, 1987
INVENTOR(S) : Tomoji NUKIYAMA

It is certified that error appears in the above-identified patent and that said Letters Patent is hereby corrected as shown below:

Column 2, Line 20, delete "bits" (second occurrence);

Column 3, Line 37, delete "discoupled", and insert therefor
--decoupled--;

Column 3, Line 42, after "that", insert -- it--;

Column 11, Line 63, delete "TOM", and insert therefor --ROM--.

Signed and Sealed this

Fifth Day of January, 1988

Attest:

DONALD J. QUIGG

*Attesting Officer*     *Commissioner of Patents and Trademarks*